United States Patent
Lin et al.

(10) Patent No.: US 10,367,775 B1
(45) Date of Patent: *Jul. 30, 2019

(54) CONVERTING ELECTRONIC MESSAGES TO MESSAGE POSTS

(71) Applicant: Google Inc., Mountain View, CA (US)

(72) Inventors: Jennifer W. Lin, San Jose, CA (US); Ping Wu, Saratoga, CA (US)

(73) Assignee: Google LLC, Mountain View, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 15/012,772

(22) Filed: Feb. 1, 2016

Related U.S. Application Data

(63) Continuation of application No. 13/585,790, filed on Aug. 14, 2012, now Pat. No. 9,252,973.

(51) Int. Cl.
  *H04L 12/58* (2006.01)

(52) U.S. Cl.
  CPC .................................. *H04L 51/32* (2013.01)

(58) Field of Classification Search
  CPC ......... H04L 67/06; H04L 67/10; H04W 84/12
  See application file for complete search history.

(56) References Cited

U.S. PATENT DOCUMENTS

| | | | | |
|---|---|---|---|---|
| 8,380,803 B1* | 2/2013 | Stibel | ................. | G06Q 30/0255 705/319 |
| 8,599,408 B2 | 12/2013 | Grueneberg et al. | | |
| 2002/0169839 A1* | 11/2002 | Goldberg | ............. | G06Q 10/107 709/206 |
| 2009/0313235 A1 | 12/2009 | Gounares et al. | | |
| 2010/0049816 A1* | 2/2010 | Zellner | ................ | G06Q 10/107 709/206 |
| 2012/0196581 A1* | 8/2012 | Papakipos | ............. | H04L 51/046 455/415 |
| 2012/0197984 A1 | 8/2012 | Rao | | |
| 2012/0221962 A1 | 8/2012 | Lew et al. | | |
| 2012/0331053 A1* | 12/2012 | Dunn | ..................... | G06Q 50/01 709/204 |
| 2013/0018960 A1 | 1/2013 | Knysz et al. | | |
| 2013/0054749 A1* | 2/2013 | Yao | ....................... | H04M 1/575 709/219 |
| 2013/0060869 A1 | 3/2013 | Davis et al. | | |
| 2013/0080544 A1 | 3/2013 | Lyons | | |
| 2013/0132589 A1 | 5/2013 | Erb et al. | | |
| 2013/0185658 A1* | 7/2013 | Sun | ..................... | G06F 17/3089 715/753 |
| 2013/0227041 A1 | 8/2013 | Rideout et al. | | |
| 2013/0246525 A1* | 9/2013 | Patil | ..................... | G06Q 10/107 709/204 |

(Continued)

*Primary Examiner* — Tauqir Hussain
*Assistant Examiner* — Jsing Forng Lin
(74) *Attorney, Agent, or Firm* — McDermott Will & Emery LLP

(57) ABSTRACT

A system and method is disclosed for converting electronic messages to message posts. An electronic message client may be integrated with a social network. An electronic message composed using the electronic message service may be designated for one or more recipients who are also members of a social network associated with a sender of the electronic message. On determining that the one or more recipients are members of the social network; at least a portion of the electronic message may be provided as a message post to a message stream associated with the one or more recipients.

18 Claims, 6 Drawing Sheets

(56) References Cited

U.S. PATENT DOCUMENTS

2013/0304830 A1* 11/2013 Olsen ................... H04L 12/581
                                                                  709/206
2014/0025734 A1   1/2014 Griffin
2015/0236998 A1*  8/2015 Verma .................... H04L 51/32
                                                                  709/206

* cited by examiner

CONVERTING ELECTRONIC MESSAGES TO MESSAGE POSTS

CROSS-REFERENCE TO RELATED APPLICATIONS

The present application claims the benefit of priority under 35 U.S.C. § 120 as a continuation of U.S. patent application Ser. No. 13/585,790 entitled "Converting Electronic Messages to Message Posts," filed on Aug. 14, 2012, the disclosure of which is hereby incorporated by reference in its entirety for all purposes.

BACKGROUND

The subject technology relates generally to social networks, namely, discussion threads. Some users may be slow to adopt use of the tools provided by social networks. For example, a user who may otherwise converse with many friends via an electronic message may not connect with those friends in a social network. Even if the user is a member of the social network, the user's message feed may remain relatively empty, thereby slowing the adoption of the social network to read or post messages.

SUMMARY

The subject technology provides a device and method for converting electronic messages to message posts. A computer-implemented method may include receiving, a first system, an electronic message designated for one or more recipients, determining that the one or more recipients are members of a social network associated with a sender of the electronic message, identifying one or more social groups in the social network for the one or more recipients, converting at least a portion of the electronic message to a message post, and providing, for a second system, the message post to a message stream associated with the one or more social groups, wherein the second system is associated with the social network. Other aspects include corresponding systems, apparatus, and computer program products for implementation of the computer-implemented method.

The previously described aspects and other aspects may include one or more of the following features. For example, identifying one or more social groups may include determining that the one or more recipients are members of a plurality of social groups, and providing the plurality of social groups to the sender for selection, wherein the one or more identified social groups are selected by the sender from the plurality of social groups. Identifying one or more social groups may include determining that the one or more recipients are in a predefined social group related to the sender, and providing the message post to the message stream for display to only members of the predefined social group. Identifying one or more social groups may include determining that the one or more recipients are not in a predefined social group related to the sender, and prompting the sender to add the one or more recipients to a user-defined social group. Identifying one or more social groups may include determining that the one or more recipients are not in a predefined social group related to the sender, and associating the recipients with a default social group if the sender has sent more than a predetermined number of electronic messages to the recipients. The electronic message may be further designated for other recipients. In this regard, identifying one or more social groups may include determining that the one or more recipients are not in a predefined social group related to the sender, determining that the other recipients of the electronic message are in a user-defined social group and that the one or more recipients were included in electronic messages to the other recipients on at least a predetermined number of other occasions, and associating the one or more recipients with the user-defined social group.

The method may also include determining that the one or more recipients are not communicatively connected with the sender in the social network, and sending a request to the one or more recipients to connect with the sender. The method may further include providing at least a portion of a message body of the electronic message as content of the message post, and providing at least a portion of a message subject of the electronic message as a heading of the message post. In this regard, converting the electronic message to the message post may include providing an attachment received with the electronic message as an attachment to the message post. Additionally or in the alternative, the portion of the message body may include one or more links to one or more resources stored at a remote location. In this regard, the method may further include formatting the content of the message post to display the one or more links as they are displayed by the message body. Additionally or in the alternative, the portion of the message body may include a representation of one or more videos or images. In this regard, the method may further include formatting the content of the message post to display one or more preview icons corresponding to the one or more videos or images.

The method may further include receiving an indication that the electronic message was forwarded by a forwarding recipient, and providing an indication that the forwarding recipient shared the message post. The method may also include receiving a reply related to the electronic message from a replying recipient, receiving an indication from the replying recipient to provide the reply to the message stream, and providing at least the portion of the reply to the message stream as a reply post to the message post. In this regard, the method may include, in response to receiving the reply, prompting the replying recipient to post the reply to the message stream, wherein the indication is received in response to the prompting.

In another aspect, a system may include a processor and a memory. The memory may include instructions that, when executed by the processor, cause the processor to facilitate receiving, from a first system, an electronic message designated for one or more recipients, facilitate making a determination that the one or more recipients are members of an online social network associated with a sender of the electronic message, and, in response to making the determination, facilitate converting at least a portion of a message body to the electronic message, and providing for display the message post to the one or more recipients in a second system, wherein the second system is associated with the social network. Other aspects include corresponding methods, apparatus, and computer program products.

The previously described aspects and other aspects may include one or more of the following features. For example, causing the processor to facilitate making the determination that the one or more recipients are members comprises may cause the processor to facilitate processing one or more address fields of a message header related to the electronic message to determine one or more electronic addresses corresponding to the one or more recipients, and facilitate making a determination that the one or more electronic addresses are associated with one or more corresponding members of the social network.

At least a portion of a subject of the electronic message may be provided with the message body as a heading of the message post. An attachment received with the electronic message may be provided with the message body as an attachment to the message post. The instructions, when executed, may further cause the processor to facilitate making a determination that the one or more recipients are in a predefined social group related to the sender, and facilitate providing the message post for display to only members of the predefined social group. Additionally or in the alternative, the instructions, when executed, further cause the processor to facilitate making a first determination that one or more first recipients of the electronic message are not in a predefined social group related to the sender, facilitate making a second determination that one or more second recipients are in a predefined social group defined by the sender and that the sender has sent other electronic messages to the first recipients, and facilitate, in response to the first determination and second determination, adding the one or more first recipients to the predetermined social group. The instructions, when executed, may further cause the processor to facilitate making a determination that the one or more recipients are not in a predefined social group related to the sender, if a default group does not exist, facilitate creating the default group, and facilitate adding the one or more recipients to the default group. The instructions, when executed, may further cause the processor to facilitate receiving, from a replying recipient, a reply related to the electronic message, and an indication to provide the reply to the social network, and provide at least a portion of the reply for display as a reply to the message post.

In a further aspect, a machine-readable medium may include instructions thereon, which when executed by a machine or computing device, cause the machine or computing device to perform a method for converting electronic messages to message posts. In this regard, the method may include facilitating receiving an electronic message designated for one or more recipients in a first system, facilitating making a determination that the one or more recipients are members of a social network associated with a sender of the electronic message, and, in response to making the determination, facilitating providing at least a portion of the electronic message for display, in a second system associated with the social network, as a message post to a message stream associated with the one or more recipients.

The previously described aspects and other aspects may provide one or more advantages, including, but not limited to, using a user's electronic message account to facilitate the population of the user's social network member's message stream, even if the user has been slow to adopt using the social network or has accumulated minimal contacts within the social network with other users, so that the member is encouraged to interact with the social network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
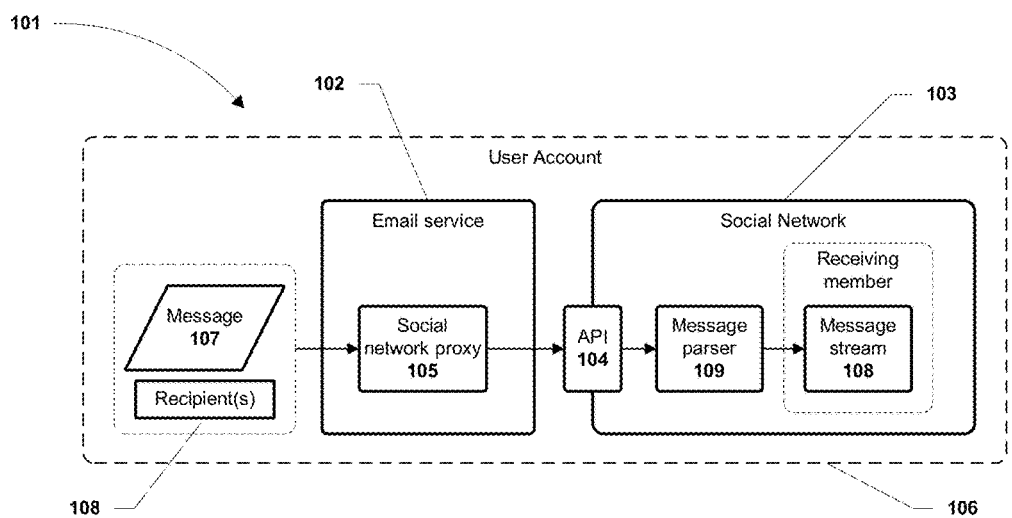
FIG. 1 is a diagram of an example system for converting electronic messages to message posts.

FIG. 1 is a diagram of an example system 101 for converting electronic messages to message posts according to one aspect of the subject technology. An electronic message service 102 (for example, an online electronic message service, desktop electronic message application, or the like) may be integrated with a social network 103, for example, via an Application Programming Interface (API) 104 exposed by social network 103 and made available to electronic message service 102. Electronic message service 102 may be provided with a social network proxy component 105 for integrating with social network 103 through API 104. In this regard, electronic message service 102 may make programming calls to API 104, for example, to send or receive messages to and from social network 103. In one aspect, electronic message service 102 and social network 103 may be further integrated with a user account 106. User account 106 may, for example, be a user account associated, for example, with electronic message service 102, social network 103, or both.

System 101 may automatically convert an electronic message 107 (for example, an email or text message), sent via electronic message service 102, to a message post (for example, a forum comment, discussion post, blog entry, or the like) viewable in a message stream 108 (for example, discussion thread, online blog, or the like) by authorized users of social network 103. In one example, when an electronic message 107 is received at electronic message service 102 of a recipient, the electronic message is automatically provided to the recipient's message stream 108. In another example, when an electronic message 107 is composed for sending through electronic message service 102, electronic message client 102 prompts the sender to confirm whether he or she would like electronic message 107 to be posted as a message post to the recipient's message stream 108, in addition to sending it to the designated recipient(s). On confirming that electronic message 107 should be posted, electronic message 107, including recipient addresses 108 and/or attachments, may be received by social network 103. An electronic message processing component 109 may process electronic message headers included with electronic message 107 and determine whether recipient addresses 108 are associated with members of social network 103. If a recipient address matches a member of social network 103 then the content body of electronic message 107 and any attachments may be posted to the recipient's message stream 108 for private viewing by the recipient.

Figure 2:
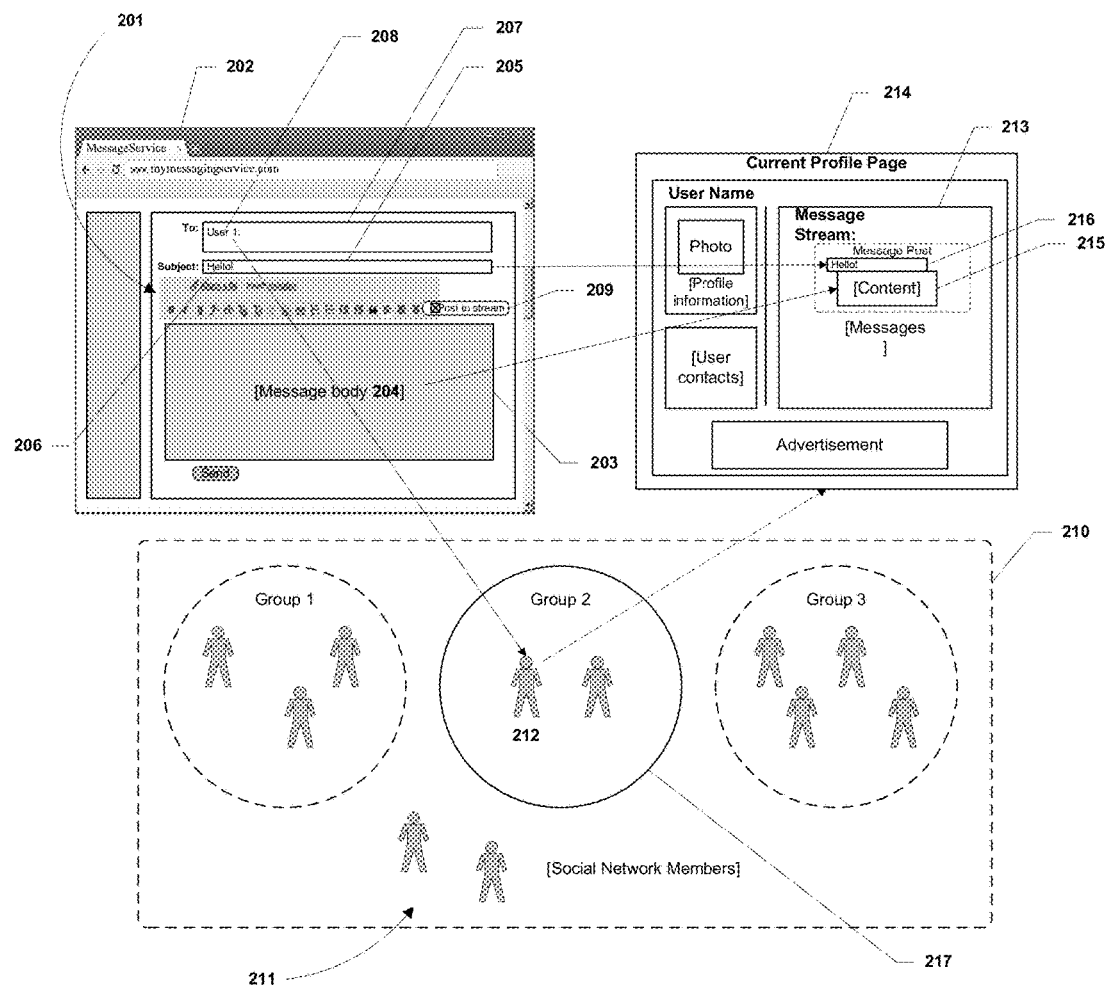
FIG. 2 is a diagram of an example electronic message client application and social message stream for use in converting electronic messages to message posts.

FIG. 2 is a diagram of an example electronic message client application and a social message stream for use in converting electronic messages to message posts according to one aspect of the subject technology. An electronic message designated for one or more recipients may be composed, for example, at an electronic message client 201 and sent to the one or more recipients through, for example, an online message service (for example, electronic message service 102). In some aspects, electronic message client 201 may be accessed via a web browser 202. Electronic message client 201 may include, for example, a content area input 203 for composing a message body 204, a subject input 205 for composing a subject line 206, and a recipient address input 207 for input of one or more recipient addresses 208. In a further aspect, electronic message client 201 may include a control 209 for selecting to post an electronic message composed at electronic message client 201 to a message stream of a social network 210.

An electronic message composed at electronic message client 201 and designated for one or more recipients associated with recipient addresses 208 may be sent to the designated recipients though electronic message channels, for example, using Simple Mail Transfer Protocol (SMTP). In addition to sending the electronic message, message body 204 and subject line 206 may be received, for example, by a system server (for example, server 501 of FIG. 5) associated with the previously described electronic message service 102 and/or social network 103. Recipient addresses 208 may be included in a message header of the electronic message, and the server may process the message header (using, for example, processing component 109) to identify recipient addresses 208 that are associated with one or more corresponding members 211 of social network 210.

In response to determining that one or more recipients at recipient addresses 208 are members of social network 210, at least a portion of the electronic message (for example, all, or one or more, user-selected paragraphs of message body 204) may be provided to the social network as a message post for display to the one or more members (for example, in a message stream) in the social network. For example, if a recipient address 208 matches an address of a social network member 212, the message post may be provided to a message stream 213 viewable at a profile page 214 associated with member 212. In this regard, the message post will comprise at least a portion of message body 204 as content 215 of the message post, and the message post may be highlighted by a heading 216 comprising at least a portion of subject line 206. In one aspect, the message will not be viewable by members of the social network who were not designated as a recipient of the electronic message.

If the electronic message includes an attachment (for example, an image, document, or audio or video file) or a link (for example, a hyperlink) to a remote resource (for example, a webpage or file stored at a remote location), the attachment or link may also be provided as part of the message post. For example, if the electronic message includes a link to a video or image stored in a remote storage location (for example, storage 507) then the message post may include, in connection with content 215, the link. Content 215 of the message post may be automatically formatted to display the link as it is displayed by message body 204.

In some aspects, one or more preview image icons may be generated for one or more links within message body 204 that link to one or more respective videos or images. The preview icons may scale according to how many attachments are included. For example, if there is only one video or image then the corresponding preview icon may be larger than if there are two or more videos or images. If there are multiple videos or images then a series of preview icons may be displayed together (for example, as a photo album). If the electronic message includes a file (for example, a document, image, video, or audio file, or the like) attached or embedded within message body 204 then the system server may copy the file to the remote storage location and then include a link to the recently stored file in the message post. The link may be embedded (for example, as HTML) within the electronic message such that the file attached to the electronic message may be displayed together with the display of content 215.

If the electronic message includes an address embedded within message body 204 the system server may automatically detect the address using, for example, regular expression matching. The address may then be included within content 215 of the message post as a link to an electronic map for display of the address or location corresponding to the address on the electronic map. In one example, the electronic map may be displayed as part of content 215, and include a visual reference (for example, a visual marker) displayed within the electronic map at a geographic location corresponding to the address.

In one aspect, the message post may be provided for display only to those recipients who are members of social network 210. In another aspect, the message post may be provided for display only to authorized members of one or more predefined social groups within social network 210. In one example, if a recipient matches a member 212, and member 212 is in a predefined social group 217 related to the sender (for example, previously created by the sender), and the sender has authorized the group to view the message post, then the message post may be provided only to the members of social group 217, and not shown to other members 211 outside the social group. Predefined social group 217 may be related to the sender in that the sender is in the same social graph with members of social group 217. Additionally or in the alternative, social group 217 may have been previously defined by the sender to include specific members of the social network (for example, friends, family, coworkers, acquaintances, and the like), or that share similar interests. If one or more recipients of the electronic message are not in a predefined social group then electronic message client 201 may prompt the sender to add those recipients to a predefined social group. The sender may be provided with a list of predefined social groups for selection. On selection of a social group the recipients may be added to the social group and the message posted to, for example, a message stream viewable by the members of the social group.

If the recipient is not in a predefined social group, the recipient may automatically be associated with a predefined social group or a default social group. The subject technology may associate a recipient not in a predefined social group with a default social group if the sender has sent more than a predetermined number of electronic messages (for example, more than three) to the recipient over a predetermined period (for example, the last six months). In another aspect, one or more recipients identified from recipient addresses 208 may not be in a predefined social group but other recipients are. On determining that the other recipients are in a predefined social group, the one or more recipients may also be associated with the predefined social group. In a further aspect, if the one or more recipients identified from recipient addresses 208 are members of social network 210 but have not communicatively connected with the sender within social network 210 (for example, have not communicated or been added to any social group associated with the sender) then a message may be sent to those recipients requesting them to connect with the sender.

With brief reference to FIG. 1, the recipient's electronic message service 102 (and/or electronic message client) may be operably connected with social network 103 (including, for example, social network 210) in the previously described manner. In this regard, the recipient may choose to convert an incoming message 107 to a message post in the recipient's message stream 213, or to a stream associated with a social group 217. For example, the recipient may pre-configure social network 103 to automatically convert incoming messages, or may select an option at a control to convert a message when the message is received at electronic message service 102. Additionally or in the alternative, a recipient may, on composing a reply electronic message, be prompted by the electronic message service (or electronic message client) to provide at least a portion of the composed reply message as a reply to the message post within social network 103. In this regard, system 101 receives an indication from the replying recipient to provide the reply electronic message to social network 103, and then provides content 215 from the reply electronic message for display as a reply post to the original message post. In some aspects, the original post and reply will only be viewable by authorized users, for example, the sender and recipient.

If the original recipient of electronic message 107 is a member of social network 103, and the original recipient forwards the electronic message to a second recipient, system 101 may post the forwarded message to a message stream 108 associated with the second recipient, and/or associate the second recipient with the social network or social group, in the same manner as previously described with respect to the original recipient. Furthermore, if electronic message 107 was posted to the second recipient's message stream 108, a representation that the original recipient shared the posted message with the second recipient may be displayed to other users within the same social group, in connection with the display of the posted message. Additionally or in the alternative, if electronic message 107 was posted to the second recipient's message stream 108, a representation that the original recipient endorsed the posted message may be displayed to those users who could view the message (for example, users within the same social group). Additional content, links, or attachments amended to, or included with, the forwarded message may also be displayed in a message stream 108 of the second recipient in the same manner as if displayed as part of the original message post, described previously.

Figure 3:
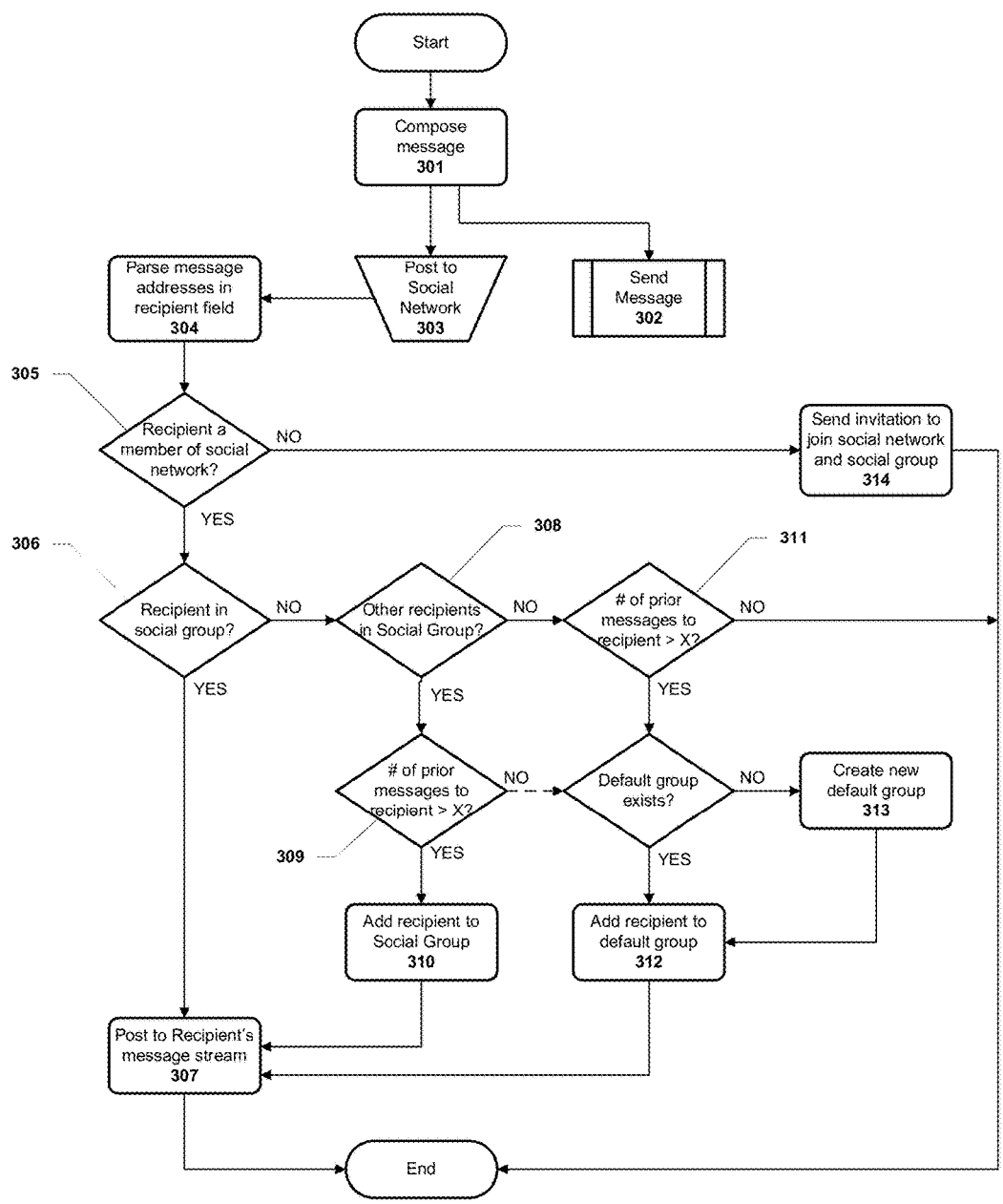
FIG. 3 is a flowchart illustrating a first example process for converting electronic messages to message posts.

FIG. 3 is a flowchart illustrating a first example process for converting electronic messages to message posts according to one aspect of the subject technology. At 301, an electronic message is composed in connection with an electronic message service (for example, electronic message service 102), and, at 302, sent to designated recipients addresses. In connection with sending the electronic message to the designated recipient addresses, at 303, the sender may designate the electronic message (using, for example, a control 209) to be posted to a message stream in a social network (for example, social network 103). On receiving an indication from the sender to post the electronic message to the social network, at 304, one or more address fields of a message header related to the electronic message may be processed (for example, by electronic message processing component 106) to determine one or more recipients corresponding to the electronic addresses included in a address header of the electronic message.

At 305, the social network may be queried to determine if recipients corresponding to the electronic addresses included in the address header are members of the social network. If an electronic address of an electronic message recipient matches a (for example, verified) electronic address of a member of the social network then, at 306, a server (for example, server 501 of FIG. 5) may determine whether the recipient is in a social graph with the sender, for example, associated with one or more predefined social groups 217 related to the sender. On determining that the recipient is in the social graph or a related social group, at 307, a message body of the electronic message may be posted to the recipient's message stream as a message post. The message post may be viewable only to the recipient designated in the electronic message, or, in some aspects, may be viewable only to members of the predefined social group but not other members. In other aspects, at the time the electronic message is composed or sent, the sender may be provided with one or more controls for selecting predefined social groups for whose members may view the message.

On determining that the recipient is not in a social graph with the sender or a predefined social group 217, the server may attempt to automatically associate the recipient with a group. In one example, the server may determine whether to add the recipient to a predefined social group based on other recipient addresses included in the electronic message. In this regard, at 308, the server may look to determine whether other designated recipients identified by the message header are in a predefined social group. In one aspect, if other recipient addresses are found to be in a predefined social group then the recipient may be placed in that group. In another aspect, if the other recipient addresses are in the predefined social group, and the recipient has been included in electronic messages along with those recipients on other occasions, the recipient may be added to the predefined social group. At 309, the server may first determine if the sender had previously sent more than a predetermined number of electronic messages (for example, more than three) to the recipient over a predetermined amount of time (for example, the past six months) before placing the recipient in the group. At 310, the recipient is placed into the predefined social group and, at previously described 307, the message body of the electronic message posted to the recipient's message stream.

If a predefined social group may not automatically be found, the server may place the recipient in a default social group. For example, at 311, the server may determine if the sender had previously sent more than a predetermined number of electronic messages to the recipient over the predetermined amount of time before placing the recipient to the default social group at 312. Optionally, at 313, the system may create the default social group if it does not exist. In some aspects, the server may prompt the sender to create and/or name the default social group (for example, if the sender has selected to not place the recipient in an predefined social group). Once the recipient is placed into the default social group, at previously described 307, the message body of the electronic message may be posted to the recipient's message stream.

If the recipient address does not match a user of the social network then, in addition to sending the electronic message to the recipient address, at 314, an invitation message may be sent to the recipient address inviting the recipient associated with the recipient address to join the social network. In other aspects, a recipient replying to an electronic message may be prompted by the recipient's electronic message client to post the reply to the message post generated by the original electronic message.

Figure 4:
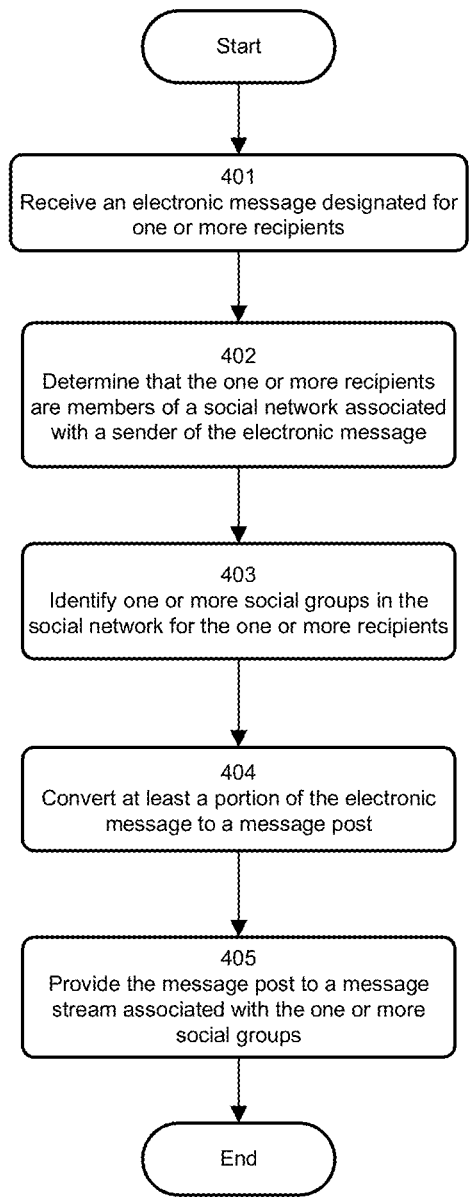
FIG. 4 is a flowchart illustrating a second example process for converting electronic messages to message posts.

FIG. 4 is a flowchart illustrating a second example process for converting electronic messages to message posts according to one aspect of the subject technology. At 401, an electronic message designated for one or more recipients is received. At 402, a determination is made that the one or more recipients are members of a social network associated with a sender of the electronic message. In response to determining that the one or more recipients are members, at 403, one or more social groups in the social network for the one or more recipients are identified. At 404, at least a portion of the electronic message is converted to a message post, and, at 405, the message post is provided to a message stream associated with the one or more social groups. The subject technology thereby facilitates population of a social network member's message stream, even if the member has been slow to adopt using the social network or has accumulated fewer contacts within the social network with other users. By populating a member's message stream, and facilitating replies to message posts by other members having similar interests within the social network, the member is encouraged to interact with the social network.

Figure 5:
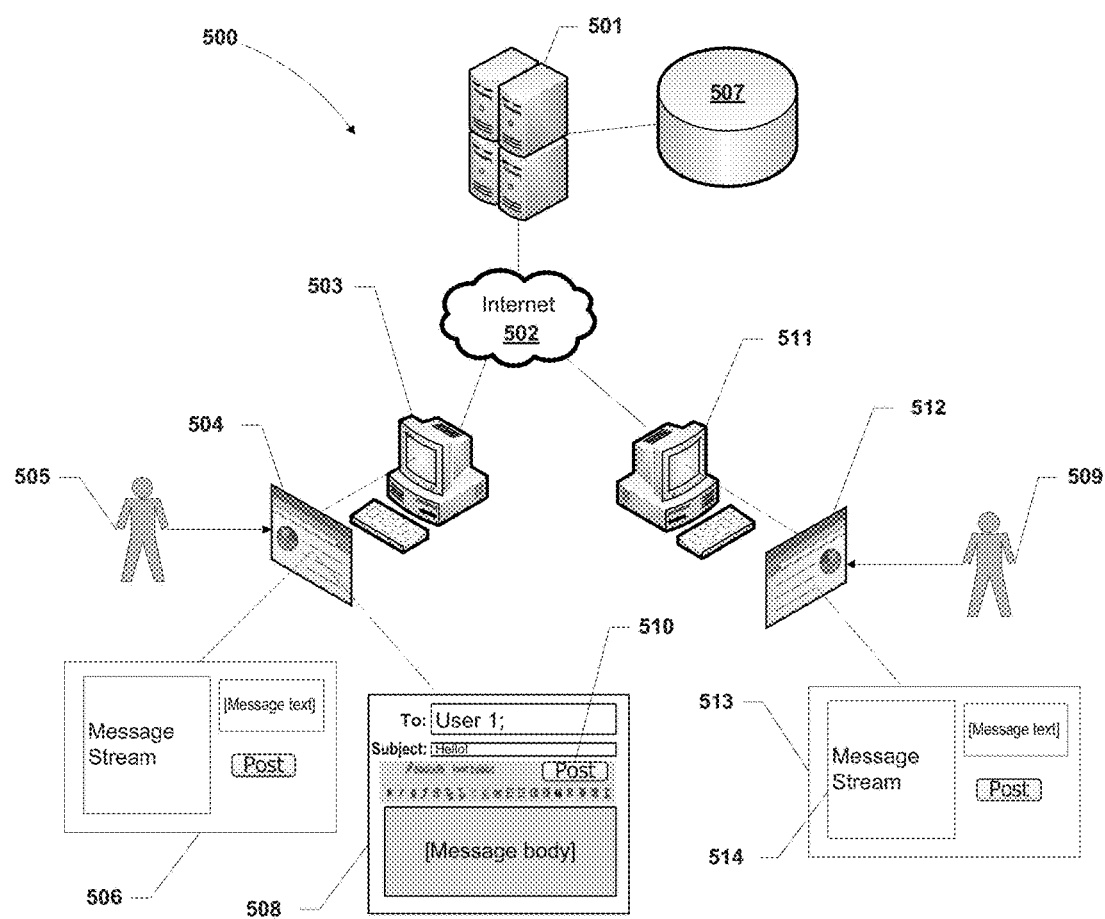
FIG. 5 is a diagram of an example system for converting electronic messages to message posts.

FIG. 5 is a diagram of an example system 500 for converting electronic messages to message posts according to one aspect of the subject technology. System 500 may include a server 501 configured to host a social network to one or more computing devices over a network 502. A first computing device 503 (for example, a desktop or server computer, tablet or notebook computer, PDA, smart phone, or the like) may display a first user interface 504 (for example, a web browser or thin client) to a first user 505. First user interface 504 may include a display of a message posting interface 506 (for example, a website hosted by server 501) for posting messages to the social network for viewing by other users. Messages received at posting interface 506 may be stored by the one or more servers 501 in a storage 507 configured for storing social network information (for example, messages and message streams). The functionality of server 501 and storage 507 may be implemented on the same physical server or distributed among a group of servers. Storage 507 may take any form such as relational databases, object-oriented databases, file structures, text-based records, or other forms of data repositories.

In some aspects, first user interface 504 may also include a display of an electronic message client interface 508 for composing electronic messages to one or more recipients, including a second user 509. Electronic message client interface 508 may include one or more controls 510 for converting an electronic message composed at electronic message client interface 508 to a message post viewable by second user 509 in accordance with the previously described manner. Server 501 may facilitate receiving an electronic message composed at electronic message client interface 508 and designated for second user 509. Server 501 may facilitate making a determination that second user 509 is a member of an online social network associated with a sender of the electronic message. In response to making the determination, server 501 may facilitate providing at least a portion of a message body of the electronic message for display as a message post to second user 509, in the social network. For example, a second computing device 511 may display a second user interface 512 to second user 509. Second user interface 512 may include a message receiving interface 513, including a message stream 514 for receiving and viewing messages posted to the social network (for example, stored in storage 507). The message body of the electronic message sent by first user 505 may be displayed in message stream 514, designated, for example, by a header representative of a portion of a subject line originally identifying the subject of the original electronic message.

Figure 6:
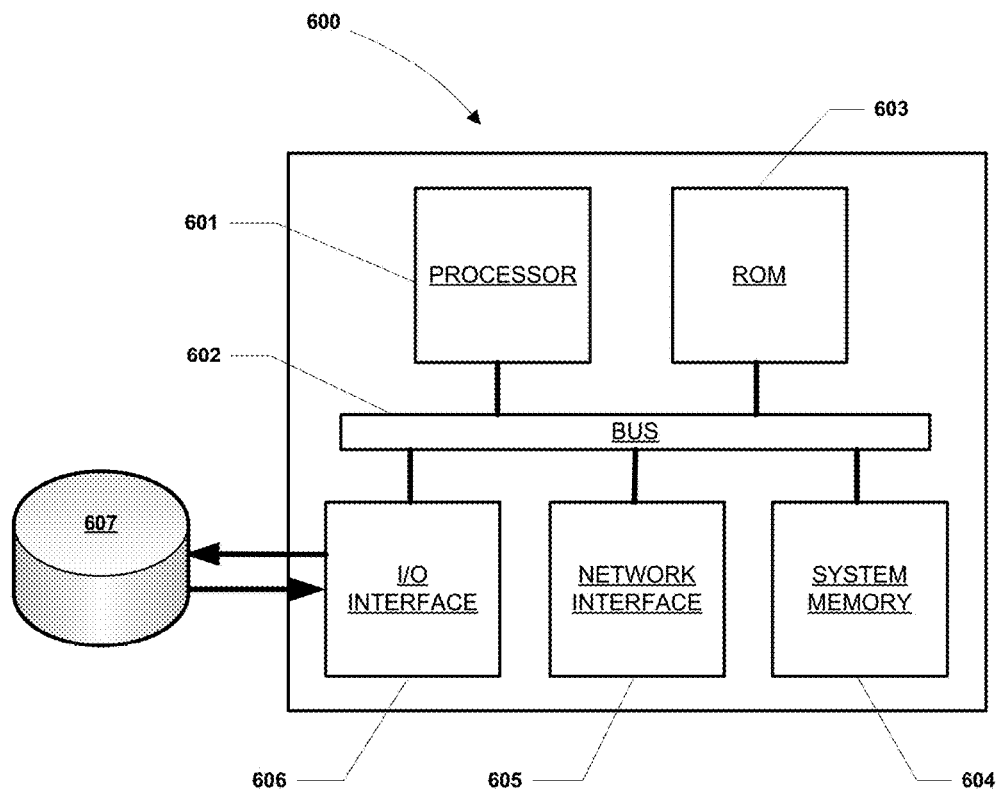
FIG. 6 is a diagram illustrating an example computer-enabled system for converting electronic messages to message posts, including a processor and other internal components.

FIG. 6 is a diagram illustrating an exemplary computer-enabled system for converting electronic messages to message posts, including a processor and other internal components, according to aspects of the subject technology. In some aspects, a computerized device 600 (for example, server 501, first computing device 503, second computing device 510, or the like) includes several internal components such as a processor 601, a system bus 602, read-only memory 603, system memory 604, network interface 605, I/O interface 606, and the like. In one aspect, processor 601 may also be communicating with a storage medium 607 (for example, a hard drive, database, or data cloud) via I/O interface 606. In some aspects, all of these elements of device 600 may be integrated into a single device. In other aspects, these elements may be configured as separate components.

Processor 601 may be configured to execute code or instructions to perform the operations and functionality described herein, manage request flow and address mappings, and to perform calculations and generate commands. Processor 601 is configured to monitor and control the operation of the components in server 600. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 601. Likewise, one or more sequences of instructions may be software stored and read from system memory 605, ROM 603, or received from a storage medium 607 (for example, via I/O interface 606). ROM 603, system memory 605, and storage medium 607 represent examples of machine or computer readable media on which instructions/code may be executable by processor 601. Machine or computer readable media may generally refer to any medium or media used to provide instructions to processor 601, including both volatile media, such as dynamic memory used for system memory 604 or for buffers within processor 601, and non-volatile media, such as electronic media, optical media, and magnetic media.

In some aspects, processor 601 is configured to communicate with one or more external devices (for example, via I/O interface 606). Processor 601 is further configured to read data stored in system memory 604 and/or storage medium 607 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 604 represents volatile memory used to temporarily store data and information used to manage device 600. According to one aspect of the subject technology, system memory 604 is random access memory (RAM) such as double data rate (DDR) RAM. Other types of RAM also may be used to implement system memory 504. Memory 604 may be implemented using a single RAM module or multiple RAM modules. While system memory 604 is depicted as being part of device 600, those skilled in the art will recognize that system memory 604 may be separate from device 600 without departing from the scope of the subject technology. Alternatively, system memory 604 may be a non-volatile memory such as a magnetic disk, flash memory, peripheral SSD, and the like.

I/O interface 606 may be configured to be coupled to one or more external devices, to receive data from the one or more external devices and to send data to the one or more external devices. I/O interface 606 may include both electrical and physical connections for operably coupling I/O interface 606 to processor 601, for example, via the bus 602. I/O interface 606 is configured to communicate data, addresses, and control signals between the internal components attached to bus 602 (for example, processor 601) and one or more external devices (for example, a hard drive). I/O interface 606 may be configured to implement a standard interface, such as Serial-Attached SCSI (SAS), Fiber Channel interface, PCI Express (PCIe), SATA, USB, and the like. I/O interface 606 may be configured to implement only one interface. Alternatively, I/O interface 606 may be configured to implement multiple interfaces, which are individually selectable using a configuration parameter selected by a user or programmed at the time of assembly. I/O interface 606 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   receiving an electronic message at a first device, originating from a server, designated for one or more recipients in a first system;
   automatically determining, in response to receiving the electronic message at the first device, that the one or more recipients are members of an online social network and members of a specific subset of users of the online social network;
   automatically prompting a sender of the electronic message for a confirmation to post at least a portion of the electronic message, wherein the sender is operating a second device different from the first device and the server;
   based on determining that the one or more recipients are members of the specific subset of the social network and receiving an indication of the confirmation, converting the at least a portion of the electronic message to a message post;
   providing, for a second system associated with the online social network, the message post to a message stream associated with at least one of the one or more recipients with visibility to members of the specific subset; and
   upon receiving a reply, prompting a replying recipient for a confirmation to post the reply to the message stream, wherein at least a portion of the reply is provided to the message stream as a reply post upon receiving the confirmation to post the reply.

2. The computer-implemented method of claim 1, wherein the converting comprises:
providing at least a portion of a message body of the electronic message as content of the message post; and
providing at least a portion of a message subject of the electronic message as a heading of the message post.

3. The computer-implemented method of claim 2, wherein the portion of the message body includes one or more links to one or more resources stored at a remote location, the method further comprising:
formatting the content of the message post to display the one or more links in the message stream as they are displayed by the message body.

4. The computer-implemented method of claim 2, wherein the portion of the message body includes a representation of one or more videos or images, the method further comprising:
formatting the content of the message post to display one or more preview icons corresponding to the one or more videos or images.

5. The computer-implemented method of claim 1, further comprising:
receiving a further reply related to the electronic message from the replying recipient; and
providing at least the portion of the further reply to the message stream as a reply post to the message post.

6. The computer-implemented method of claim 1, further comprising:
receiving an indication that the electronic message was forwarded by a forwarding recipient; and
providing, based on receiving the indication, an indication within the message stream that the forwarding recipient shared the message post.

7. The computer-implemented method of claim 1, further comprising:
determining a plurality of social groups associated with the one or more recipients;
providing the plurality of social groups to the sender for selection; and
receiving, from the sender, a selection of one or more social groups from the plurality of social groups,
wherein the message post is provided only to the recipients associated with the selected one or more social groups.

8. The computer-implemented method of claim 1, wherein the one or more recipients are in a predefined social group related to the sender in the online social network, the method further comprising:
providing the message post to the message stream for display to only the recipients that are members of the predefined social group.

9. The computer-implemented method of claim 1, wherein the electronic message is further designated for other recipients, the method further comprising:
determining that the one or more recipients are not directly connected to the sender in the online social network;
determining that the other recipients of the electronic message are in a user-defined social group with the sender and that the one or more recipients were included in electronic messages to the other recipients on at least a predetermined number of other occasions; and
associating the one or more recipients with the user-defined social group.

10. A system, comprising:
one or more processors; and
a memory, the memory including instructions that, when executed by the one or more processors, cause the one or more processors to execute operations facilitating the performance of:
receiving an electronic message designated for one or more recipients;
automatically determining, in response to receiving the electronic message, that the one or more recipients are members of an online social network and members of a specific subset of users of the online social network;
automatically prompting a sender of the electronic message for a confirmation to post at least a portion of the electronic message;
converting, based on determining that the one or more recipients are members of the specific subset of the social network and receiving an indication of the confirmation, the at least a portion of the electronic message to a message post;
providing, for a system associated with the online social network, the message post to a message stream associated with at least one of the one or more recipients with visibility to members of the specific subset; and
upon receiving a reply, promoting a replying recipient for a confirmation to post the reply to the message stream, wherein at least a portion of the reply is provided to the message stream as a reply post upon receiving the confirmation to post the reply.

11. The system of claim 10, wherein the converting comprises:
providing at least a portion of a message body of the electronic message as content of the message post; and
providing at least a portion of a message subject of the electronic message as a heading of the message post.

12. The system of claim 11, wherein the portion of the message body includes one or more links to one or more resources stored at a remote location, the method further comprising:
formatting the content of the message post to display the one or more links in the message stream as they are displayed by the message body.

13. The system of claim 11, wherein the portion of the message body includes a representation of one or more videos or images, the method further comprising:
formatting the content of the message post to display one or more preview icons corresponding to the one or more videos or images.

14. The system of claim 10, wherein the operations further facilitate the performance of:
receiving a further reply related to the electronic message from the replying recipient; and
providing at least the portion of further reply to the message stream as a reply post to the message post.

15. The system of claim 10, wherein the operations further facilitate the performance of:
receiving an indication that the electronic message was forwarded by a forwarding recipient; and
providing, based on receiving the indication, an indication within the message stream that the forwarding recipient shared the message post.

16. The system of claim 10, wherein the operations further facilitate the performance of:
determining a plurality of social groups associated with the one or more recipients;
providing the plurality of social groups to the sender for selection; and
receiving, from the sender, a selection of one or more social groups from the plurality of social groups, wherein the message post is provided only to the recipients associated with the selected one or more social groups.

17. The system of claim 10, wherein the one or more recipients are in a predefined social group related to the sender in the online social network, and wherein the operations further facilitate the performance of:

providing the message post to the message stream for display to only the recipients that are members of the predefined social group.

18. A non-transitory machine-readable medium including instructions thereon, which when executed by a machine or computing device, cause the machine or computing device to perform a method comprising:

facilitating receiving an electronic message designated for one or more recipients;

facilitating automatically determining, in response to receiving the electronic message, that the one or more recipients are members of an online social network and members of a specific subset of users of the online social network;

facilitating automatically prompting a sender of the electronic message for a confirmation to post at least a portion of the electronic message;

facilitating converting, based on determining that the one or more recipients are members of the specific subset of the social network and receiving an indication of the confirmation, the at least a portion of the electronic message to a message post;

facilitating providing, for a system associated with the online social network, the message post to a message stream associated with at least one of the one or more recipients with visibility to members of the specific subset; and upon receiving a reply, prompting a replying recipient for a confirmation to post the reply to the message stream, wherein at least a portion of the reply is provided to the message stream as a reply post upon receiving the confirmation to post the reply.

* * * * *